United States Patent

[11] 3,586,237

| [72] | Inventor | Milton L. Taylor<br>3586 Tabor Road, Sodus, Mich. 49126 |
|---|---|---|
| [21] | Appl. No. | 832,575 |
| [22] | Filed | June 12, 1968 |
| [45] | Patented | June 22, 1971 |

[54] SPRAYING DEVICE
4 Claims, 7 Drawing Figs.

[52] U.S. Cl. ..................................... 239/78,
239/172, 239/655
[51] Int. Cl. ..................................... B05b 7/26
[50] Field of Search .......................... 239/77, 78,
146, 172, 654, 655

[56] References Cited
UNITED STATES PATENTS

| 2,253,802 | 8/1941 | Ness et al. | 239/78 |
| 2,770,912 | 11/1956 | Deem | 239/655 X |
| 2,925,222 | 2/1960 | Spreng | 239/77 X |
| 3,252,656 | 5/1966 | Greenwood | 239/654 X |
| 3,329,322 | 7/1967 | Herd | 239/655 X |

Primary Examiner—M. Henson Wood, Jr.
Assistant Examiner—Michael Y. Mar
Attorney—Oltsch & Knoblock ABSTRACT: A spraying device including an air blower mounted to a frame and a duct having one end connected to the air blower for receiving forced air therefrom. The opposite end of the duct defines a pair of oppositely directed discharge heads which project from opposite sides of the spraying device and which each have an outlet mouth. Nozzle means are connected to a source of spray material and are adapted to project spray material into the path of the forced air passing through each outlet mouth. Means are mounted in the duct between the discharge heads for causing said forced air to be diverted into a selected one of the discharge heads and out the outlet mouth associated therewith.

PATENTED JUN22 1971

INVENTOR.
MILTON L. TAYLOR

BY Oltsch & Knoblock

ATTORNEYS

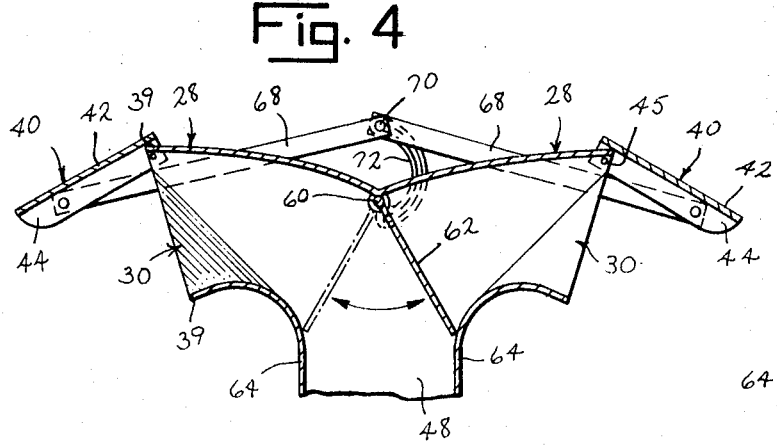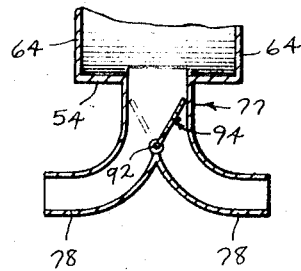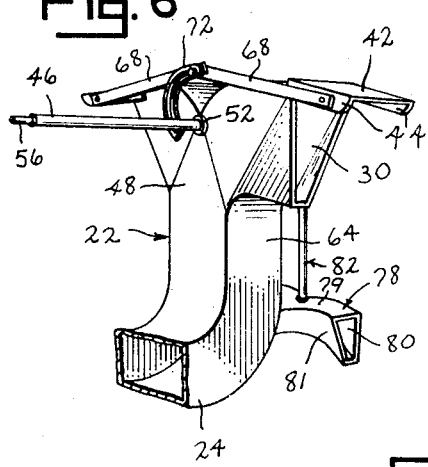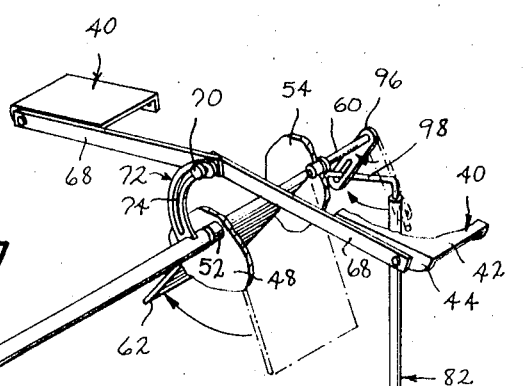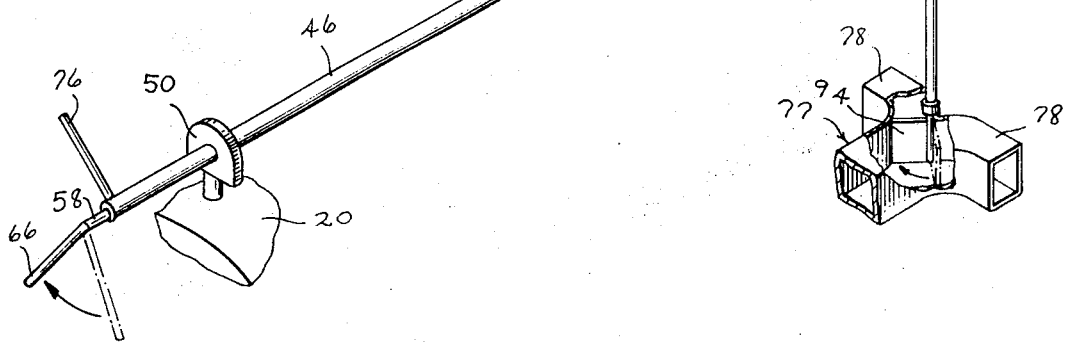
INVENTOR.
MILTON L. TAYLOR
BY Oltsch & Knoblock
ATTORNEYS 3,586,237

1

SPRAYING DEVICE

SUMMARY OF THE INVENTION

This invention pertains to a spraying device and has particular application to a spraying vehicle in which the spray material issuing therefrom may be diverted to one selected side of the vehicle.

One problem associated with spraying row crops, orchards, berry bushes and similar agricultural growth is that of wind. Wind has a tendency to divert and misdirect the spray material, thereby causing a waste of the spray material, uneven coverage of the crops and sometimes a danger to the sprayer user. This problem has become even more acute with the advent of the mist or fog sprays, which can be affected by even the slightest breeze. Thus in utilizing a spraying device of the construction in which spray material is discharged simultaneously to both sides of the device as it passes between rows of crops, there will be substantially greater spray coverage of the row of crops at the leeward side of the device than the row of crops at the windward side of the device.

Other spraying devices have a single pivotal spray discharge head which permits spray material to be discharged to one side of the device at a time, thereby enabling the user thereof to spray only that row of crops to the leeward side of the device, and thus conserve spray. This type device, in being selectively one-directional in its spray discharge, has an economical spray use advantage over a spraying device which simultaneously discharges spray material to both sides of the device, but is also more complex mechanically and generally more costly than such a simultaneous two-directional spray device.

The spraying device of this invention includes an air blower and oppositely directed laterally projecting spray discharge heads which are connected to the blower and which include means to divert the passage of the blower air flow through a selected one of the discharge heads. In this manner, the user of the spraying device, when spraying in the presence of a crosswind, can cause the spray to be directed only to the leeward side of the spraying device where it can receive a wind assist in covering the crops. The means for diverting the air flow into one or the other discharge head is of simple and economical construction and permits a spraying device having oppositely directed discharge heads to be safely and economically used in the presence of a wind.

Additionally, the spraying device of this invention includes both upper and lower discharge heads at each side of the device. Each upper head serves to project the spray spacedly outwardly from the device, and each lower head serves to simultaneously project the spray adjacently outwardly from the device so that the heads in combination discharge cause the spray to be uniformly applied over the crops.

Accordingly, it is an object of this invention to provide a spraying device having oppositely directed spray discharge heads and including means for directing forced air, in which spray material is entrained, through a selected one of said discharge heads.

It is another object of this invention to provide an economical spraying device having means to vary the direction of spray discharge from one side of the device to the other.

Still another object of this invention is to provide a spraying device having means for causing the uniform application of spray material over selected crops.

Other objects of this invention will become apparent upon a reading of the invention's description.

BRIEF DESCRIPTION OF THE DRAWINGS

A preferred embodiment of this invention has been chosen for purposes of illustration and description wherein.

2

Figure 3:
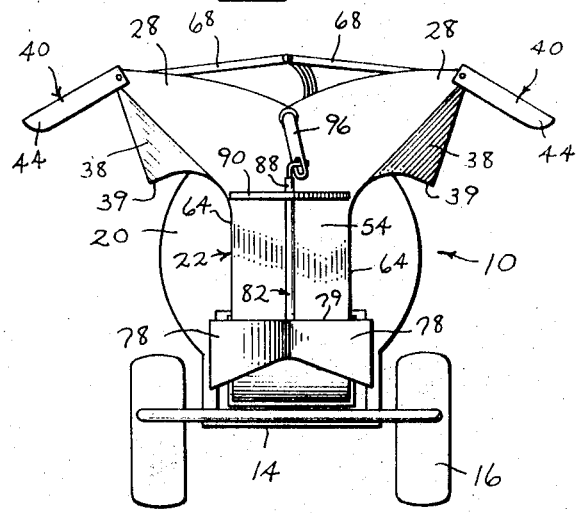

FIG. 3 is a rear elevation of the spraying device.

Figure 1:
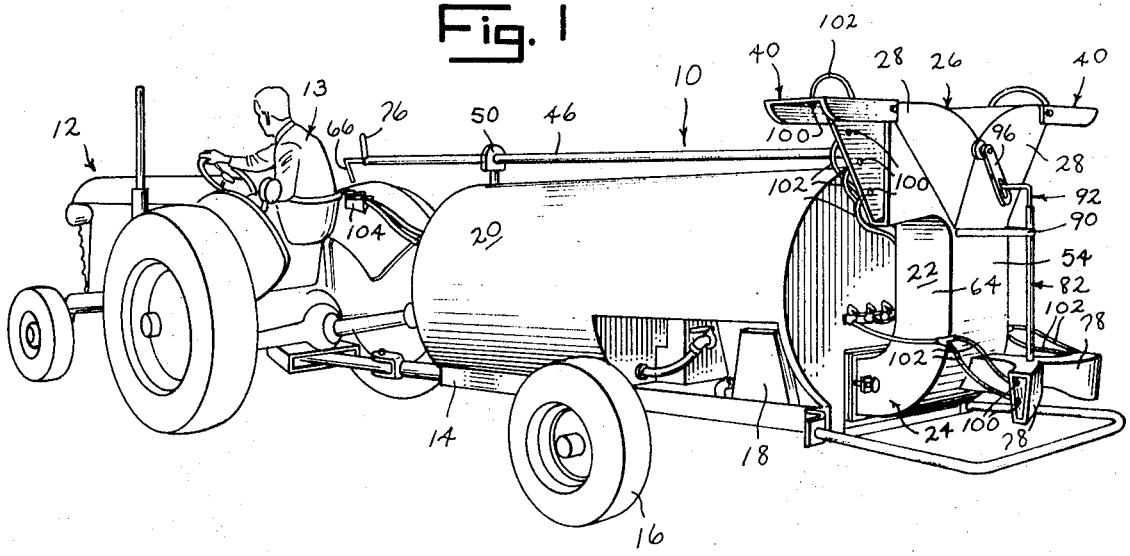
FIG. 1 is a perspective view of the spraying device attached to a towing vehicle.
Figure 2:
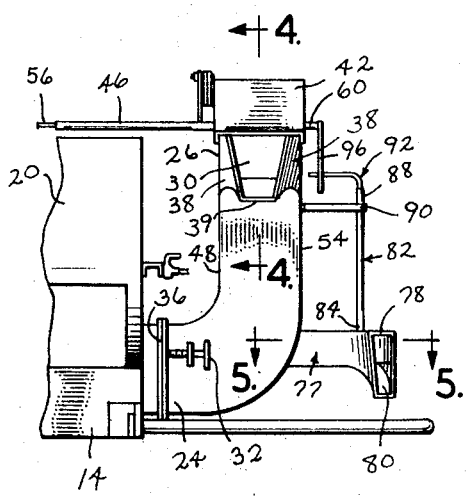
FIG. 2 is a fragmentary side elevation of the spraying device.

FIG. 4 is a fragmentary sectional view taken along line 4-4 of FIG. 2.

FIG. 5 is a fragmentary sectional view taken along line 5-5 of FIG. 2.

FIG. 6 is another perspective view of a fragmentary portion of a spraying device.

FIG. 7 is a fragmentary perspective view of the spraying device showing the actuating parts of the spray discharge components thereof in isolated form.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The illustrated embodiment of the spraying device of this invention is designated by the reference numeral 10. Although spraying device 10 is shown as a towed device, it is to be understood that the teachings of this invention would have equal application to a sprayer which is self-propelled.

Spraying device 10 includes a frame 14 to which is mounted wheels 16, an air blower 18, which may be of the centrifugal type, and a liquid spray tank 20. Spraying device 10 is adapted for connection to a tractor 12 and, as thus far described, is of a construction commonly utilized in the art.

Spraying device 10 includes a duct 22 having a lower end portion 24 which is connected to the outlet of blower 18 and an upper substantially T-shaped end portion 26 which defines a pair of oppositely directed discharge heads 28 which project laterally outwardly relative to the spraying device. Each discharge head 28 terminates in an outlet mouth 30, which is preferably positioned approximately 4 —7 feet above ground level. Lower end portion 24 of duct 22 is preferably removably attached to the outlet of blower 18 by means of threaded fasteners 32 (only one shown) which extend through lugs 34 at lower end portion 26 and threadedly engage a corresponding flange part 36, forming a part of the blower outlet. It is to be understood that the means of attaching lower end portion 24 of the duct part to the blower outlet may vary. Duct 22 beginning with lower end portion 24 at its connection to blower 18 and terminating adjacent each respective outlet mouth 30 of discharge heads 28 is preferably of substantially constant cross-sectional area with each outlet mouth being of reduced cross-sectional area and defined by downwardly convergent sidewall parts 38, and substantially parallel upper and lower wall parts 39, so as to be of a trapezoidal shape, as best shown in FIG. 2. A deflector 40 having a face part 42 and downturned side flanges 44 is pivotally connected at 45 to each discharge head 28 at its outlet mouth 30. A tubular member 46 extends longitudinally of spraying device 10 from a position preferably adjacent the driver 13 of tractor 12 to forward sidewall 48 of duct 22, terminating preferably at a point midwidth of the duct and adjacent the place of separation of discharge heads 28 thereof. Tubular member 46 is journaled in and supported by a bushing 50 which is mounted to the forward end of the spraying device, preferably on tank 10, and a bushing 52 which is mounted to the sidewall 48 of duct 22 so as to be rotatable about its longitudinal axis. A collar (not shown) may encircle and be secured to tubular member 46 adjacently rearwardly of bushing 50 so as to assist in preventing the tubular member from being withdrawn from its journaling parts 50 and 52. An aperture is formed in sidewall 48 of the duct in registry with the bore in tubular member 46 and a second aperture is preferably formed in rear sidewall 54 of duct 22 in alignment with the aperture in sidewall 48. A rod 56 extends with clearance through the bore in tubular member 46 and has one end portion 58 protruding from the forward end of the tubular member 46 and its other end portion 60 protruding with clearance through the respective apertures in duct sidewalls 48 and 54, thus spanning duct 22, and rearwardly outwardly from the sidewall 54. A baffle member or a plate 62 is disposed within duct 22 between discharge heads 28 and is positioned longitudinally relative to the spraying device. Baffle plate 62 has one end edge attached, as by welding, to that part of rod end portion 60 which spans the duct and its side edges positioned preferably slightly inwardly spaced from the sidewalls 48 and 54 of the duct so as to be pivotal within the duct upon the turning of rod 56. The free end of baffle plate 62 extends into the central vertical portion of the duct below the level of discharge heads 28 and is adapted to engage one sidewall 64 of the duct when swung in one direction in the duct, as shown in solid lines in FIG. 4, and to engage the opposite sidewall 64 of the duct when swung in the opposite direction in the duct, as shown in broken lines in FIG. 4, thereby sealing one or the other discharge head 28 from the remainder of the duct. When baffle plate 62 is swung to one side of the duct, sealing or blocking the discharge head 28 at that side of the duct, the cross-sectional area of the duct, including that of the open discharge head as defined in part by the baffle plate, is preferably substantially constant. To facilitate turning of rod 56, forward end portion 58 of the rod includes a handle part 66.

A link 68 is pivotally attached at one end to a side flange 44 of one deflector 40 adjacent the free end thereof and extends transversely therefrom to the center of the spraying device, overlying tubular member 46 where its opposite free end is pivotally connected by a pin 70 to the opposite free end of another link 68 which is similarly connected to the other deflector 40. A cam member 72 defining an arcuate camming slot 74 is rigidly connected at one end to tubular member 46 just forwardly of bushing 52 thereof. Pivot pin 70 protrudes with slight clearance through camming slot 74 in member 72 so that upon turning of tubular member 46, pivot pin 70 will be caused to follow the camming surfaces of slot 74 in member 72 and thereby cause the pivotal movement of deflectors 40. To facilitate turning of tubular member 46, the forward end portion of member 46 includes a laterally projecting handle part 76.

Duct 22 preferably includes a duct part 77 which extends rearwardly from sidewall 54 of the duct, substantially opposite the outlet of blower 18. Duct part 77 defines oppositely directed discharge heads 78 which project substantially laterally outwardly relative to the spraying device. Each discharge head 78 preferably terminates in an outlet mouth 80 which is of similar shape as outlet mouths 30 of discharge heads 28. A vertical tubular member 82 is positioned rearwardly of sidewall 54 of duct 22. Tubular member 82 includes a lower end 84 which communicates with an aperture in duct part 77 located midwidth of the duct part in the upper wall 79 adjacent the place of separation of discharge heads 78 and an upper end 88 which is spaced below the extended axis of rod 56 and which is fixedly positioned by a bracket 90 connected to duct 22. A rod 92 extends with clearance through tubular member 82 and into duct part 77. A baffle plate or member 94 is positioned within duct part 77 and is rigidly connected at that portion of rod 92 which projects into the duct part so as to be swingable upon the turning of rod 92 in a horizontal plane about a vertical axis from one side to the other of the duct part and thereby serve to close a selected discharge head 78. The upper end 98 of rod 92 is preferably bent at substantially a right angle to the rod axis and projects through a slot in one end of a plate 96 which is rigidly attached at its other end to the end portion 60 of rod 56 which projects rearwardly from duct 22.

A plurality of nozzles 100 may be mounted in sidewall parts 38 of each discharge head 28 at the outlet mouth 30 thereof. Similarly, one or more nozzles 100 may be mounted in a sidewall 81 of each discharge head 78 at outlet mouth 80 thereof. Conduits 102 interconnect nozzles 100 with tank 20. Additionally, a nozzle 100 may be mounted to face part 42 of each deflector 40 adjacent the free edge thereof and connected to rank 20 by a conduit 102.

When spraying in a crosswind, the tractor driver 13 turns handle 66 to cause baffle plates 62 and 94 to close those discharge heads 28 and 78 respectively at the windward side of the spraying device. Baffle plates 62 and 94 are caused to simultaneously swing in the same direction between respective discharge heads upon turning of handle 66 by the pivotal movement of plate 96 attached to rod 56 and the follower movement of end 98 of rod 92 which causes rod 92 to turn. The nozzles 100 at each side of the spraying device are preferably connected to tank 20 by a suitable valve means (not shown) so as to enable all nozzles at one selected side of the device to be collectively shut off when the air flow through the discharge heads associated therewith is terminated. To regulate the area of spray coverage, deflectors 40 may be pivoted in a vertical plane by turning handle part 76. It is to be understood that the actuating means 104 for the nozzle valve means which regulate the flow of spray material from tank 20, handle part 76 used to move deflectors 40, and handle part 66 used to move baffle plates 62 and 94 are preferably located within easy reach of the driver of the tractor 12.

In some applications of this invention, duct part 77 and its associated discharge heads may be omitted, thus relying entirely upon discharge heads 28 to provide sufficient spray coverage. When both pairs of discharge heads are utilized, discharge heads 28 will generally direct the spray laterally outwardly of the spraying device, and discharge heads 78 will direct the spray to those areas laterally adjacent the spraying device. Additionally, discharge heads 78 may also be directed rearwardly as well as laterally so as to issue a spray to the rear of device 10 and permit the spraying device to straddle and spray certain low-level crops, such as celery, as well as spraying the adjacent crop rows between which the device passes. It is also to be understood that baffle plates 62 and 94 can be centered between their respective discharge heads to permit the spray to be directed simultaneously from both sides of the spraying device.

What I claim is:

1. In a spraying device including a frame, an air blower mounted to said frame, a duct having one end connected to said blower for receiving forced air therefrom and its opposite end defining first and second spaced pairs of oppositely directed discharge heads, said second pair of discharge heads being positioned below said first pair of discharge heads, each discharge head having an outlet mouth, first means mounted in said duct at said first pair of discharge heads for causing said forced air to be diverted into a selected discharge head of said first pair of discharge heads, and second means mounted in said duct at said second pair of discharge heads for causing said forced air to be diverted into a selected discharge head of said second pair of discharge heads, said first and second air diverting means being correlated in movement so that actuation of one causes actuation of the other air diverting means.

2. In a spraying device including a frame, an air blower mounted to said frame, a duct having one end connected to said blower for receiving forced air therefrom and its opposite end defining first and second spaced pairs of oppositely directed discharge heads, said second pair of discharge heads being positioned below said first pair of discharge heads, each discharge head having an outlet mouth, first means mounted in said duct at said first pair of discharge heads for causing said forced air to be diverted into a selected discharge head of said first pair of discharge heads, and second means mounted in said duct at said second pair of discharge heads for causing said forced air to be diverted into a selected discharge head of said second pair of discharge heads, each discharge head of said first and second pairs of discharge heads being laterally directed relative to said spraying device, both said first and second air diverting means being correlated in movement so that actuation of one causes actuation of the other air diverting means and the diversion of substantially all said forced air into those discharge heads directed to one side of said spraying device.

3. In a spraying device including a frame, an air blower mounted to said frame, a duct having one end connected to said blower for receiving forced air therefrom and its opposite end defining first and second spaced pairs of oppositely directed discharge heads, said second pair of discharge heads being positioned below said first pair of discharge heads, each discharge head having an outlet mouth, first means mounted in said duct at said first pair of discharge heads for causing said forced air to be diverted into a selected discharge head of said first pair of discharge heads, and second means mounted in said duct at said second pair of discharge heads for causing said forced air to be diverted into a selected discharge head of said second pair of discharge heads, said first air diverting means including a baffle pivotally connected in said duct between the discharge heads of said first pair of discharge heads and swingable about its pivot connection into substantial sealtight engagement with either discharge head of said first pair of discharge heads to block the flow of air therethrough, said second air diverting means including a baffle pivotally connected in said duct between the discharge heads of said second pair of discharge heads and swingable about its pivot connection into substantial sealtight engagement with either discharge head of said second pair of discharge heads to block the flow of air therethrough, a first actuator means connected to one said baffle for causing pivotal movement thereof, a second actuator means connected to the other said baffle for causing pivotal movement thereof and having parts engaging said first actuator means so as to be responsive to the movement of said first actuator means whereby actuation of said first actuator means causes each baffle to engage a discharge head and prevent the flow of air therethrough.

4. The spraying device of claim 3 wherein the discharge heads of said second mentioned pair of discharge heads are substantially oppositely directed, each discharge head of both pairs of discharge heads being laterally directed relative to said spraying device, and wherein said first and second actuator means are operatively connected so that actuation of said first actuating means causes substantially all of said air flow to be diverted into those discharge heads directed to one side of said spraying device.